US012634251B2

(12) United States Patent
Agrawal et al.

(10) Patent No.:  US 12,634,251 B2
(45) Date of Patent:     May 19, 2026

(54) AUTOMATIC OBFUSCATION OF SENSITIVE INFORMATION IN NOTIFICATIONS PRESENTED WHILE AN ELECTRONIC DEVICE IS NOT BEING ATTENDED TO BY AN AUTHORIZED USER

(71) Applicant: MOTOROLA MOBILITY LLC, Wilmington, DE (US)

(72) Inventors: Amit Kumar Agrawal, Bangalore (IN); Panduranga Reddy Pailla, Nalgonda (IN); Vijayprakash Idlur, Taluk (IN)

(73) Assignee: Motorola Mobility LLC, Chicago, IL (US)

( * ) Notice: Subject to any disclaimer, the term of this patent is extended or adjusted under 35 U.S.C. 154(b) by 35 days.

(21) Appl. No.: 18/399,245

(22) Filed: Dec. 28, 2023

(65) Prior Publication Data

US 2025/0219975 A1     Jul. 3, 2025

(51) Int. Cl.
*G06F 15/16*        (2006.01)
*G06F 21/62*        (2013.01)
*H04L 51/063*        (2022.01)
*G06F 21/32*        (2013.01)
*H04L 51/224*        (2022.01)

(52) U.S. Cl.
CPC ........ *H04L 51/063* (2013.01); *G06F 21/6254* (2013.01); *G06F 21/32* (2013.01); *H04L 51/224* (2022.05)

(58) Field of Classification Search
CPC . H04L 51/063; H04L 51/224; G06F 21/6254; G06F 21/32

USPC ......................................................... 709/206
See application file for complete search history.

(56)              References Cited

U.S. PATENT DOCUMENTS

| | | | | |
|---|---|---|---|---|
| 12,248,610 | B1 * | 3/2025 | Marrone ............. | G06F 21/6245 |
| 2014/0095870 | A1 * | 4/2014 | Dewan ................ | H04L 63/0428 |
| | | | | 713/167 |
| 2018/0123822 | A1 * | 5/2018 | Zibuschka ............. | G05B 15/02 |
| 2020/0134240 | A1 * | 4/2020 | Balakrishna ............ | G06F 3/147 |
| 2020/0301917 | A1 * | 9/2020 | Niu ........................ | G06F 16/248 |
| 2021/0374275 | A1 * | 12/2021 | Singh .................... | G06F 16/538 |
| 2024/0223856 | A1 * | 7/2024 | Ridgill .................. | G06F 3/1454 |
| 2025/0097569 | A1 * | 3/2025 | Bartov ..................... | H04N 5/76 |

* cited by examiner

*Primary Examiner* — Alan S Chou
(74) *Attorney, Agent, or Firm* — Isidore PLLC

(57)                    ABSTRACT

A method provides techniques for automatic obfuscation of sensitive information. The sensitive information can include one-time passcodes that surface on an electronic device. The method includes receiving a notification comprising sensitive information. The method continues with determining that a notification setting of the electronic device enables presentation of received notifications, and determining that the notification setting of the electronic device further includes enabling dynamic obfuscation of the sensitive information if a presence of an authorized user of the electronic device is not confirmed. The sensitive information is automatically obfuscated from being presented during presentation of the notification. A modified notification is presented on the electronic device, where the modified notification includes the received notification with the sensitive information obfuscated.

18 Claims, 10 Drawing Sheets

304

306

302

300

Paybu Unlock device to view your security code. Don't share your code.

504

506

502

500

AUTOMATIC OBFUSCATION OF SENSITIVE INFORMATION IN NOTIFICATIONS PRESENTED WHILE AN ELECTRONIC DEVICE IS NOT BEING ATTENDED TO BY AN AUTHORIZED USER

BACKGROUND

1. Technical Field

The present disclosure generally relates to portable electronic devices, and more specifically to portable electronic devices that support receiving security notifications.

2. Description of the Related Art

Modern portable electronic devices, such as smartphones and tablet computers, can provide a myriad of features. These features can include text-based communication features, such as sending and receiving text messages (also known as short message service or SMS), and secure electronic/online account login support features, such as Multi-Factor Authentication (MFA), which provides an additional layer of security beyond traditional username and password combinations. The role of text messages in MFA involves using a mobile device to receive a one-time verification code, adding an extra step to the account access authentication process. In MFA, users are required to provide two or more factors to authenticate themselves. The first factor is usually something the user knows (e.g., a password), and the second factor is something the user has or is provided by the computer system implementing the MFA. In many situations, data provided via a text message serve as a second factor that is communicated to the user's mobile device whose phone number or text ID is associated with the electronic account being accessed. Thus, when a user attempts to log in to the electronic account, a one-time passcode is sent to the user's mobile device via text message. The one-time passcode is valid for a short period and is used in conjunction with the login password to complete the authentication process to access the account.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
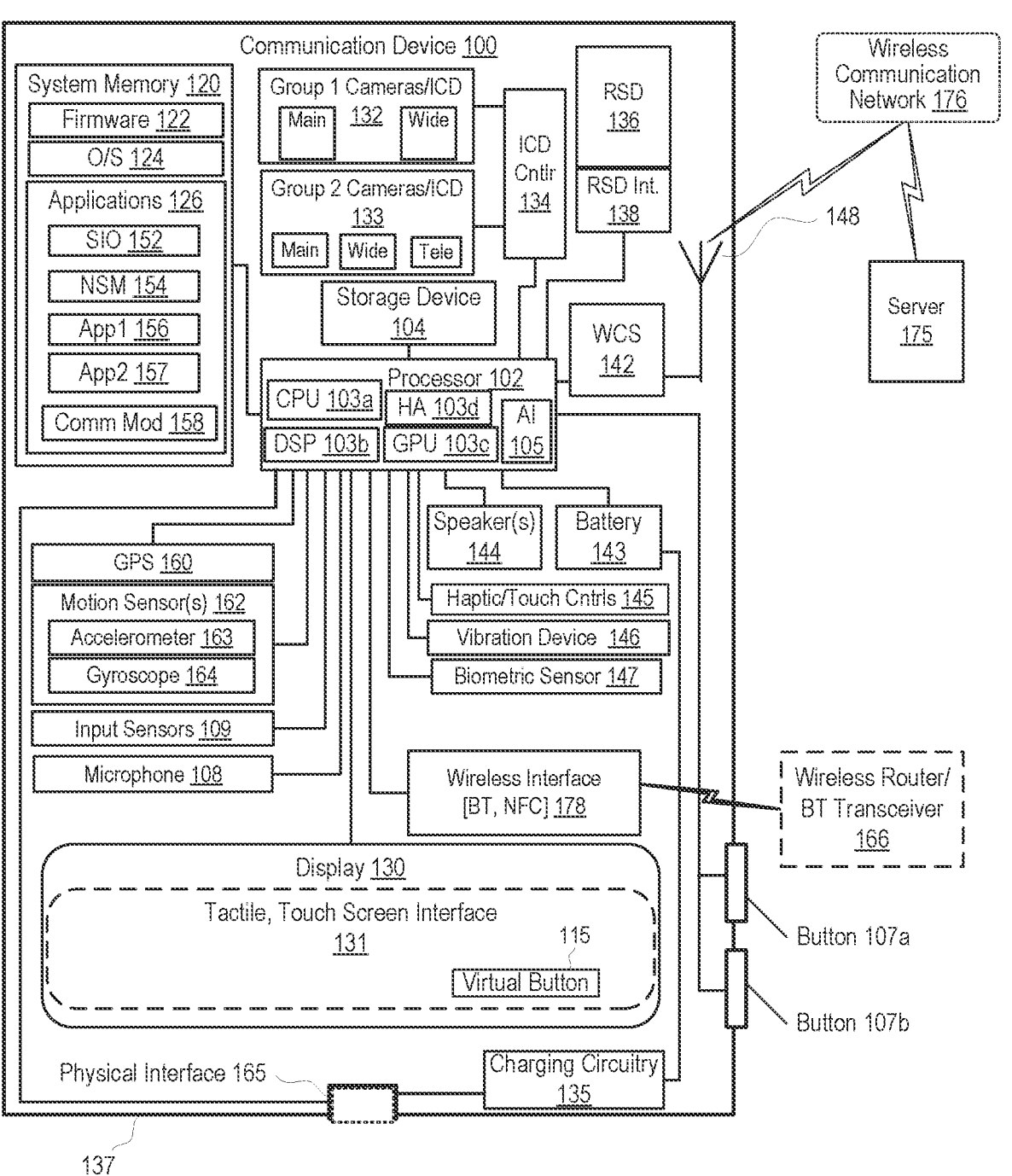
FIG. 1 depicts an example component makeup of an electronic device with specific components used to enable the device to enable automatic obfuscation of sensitive information in a message, according to one or more embodiments.

According to aspects of the present disclosure, an electronic device, a method, and a computer program product provides techniques for obfuscating sensitive information presented within notifications received while the electronic device is not being attended to by an authorized user. According to an additional aspect, the techniques include automatically obfuscating sensitive information presented within notifications received while the electronic device is in a locked state. The method includes receiving, by a processor of an electronic device, a notification comprising sensitive information. The method includes determining that the notification setting of the electronic device further includes dynamic obfuscation of the sensitive information when a presence of an authorized user of the electronic device is not confirmed. The method includes in response to the notification setting including dynamic obfuscation of the sensitive information: automatically obfuscating the sensitive information from being presented during presentation of the notification; and presenting a modified notification on at least one output device of the electronic device, where the modified notification includes the received notification with the sensitive information obfuscated or not presented.

There are many applications today that utilize multi-factor authentication (MFA) with a one-time passcode (OTP) sent via text message to a user's mobile device. These applications can include, but are not limited to, ecommerce applications, banking applications, social media applications, email and messaging applications, video streaming applications, travel reservation applications, ticket sales applications, and more. Thus, the OTP is an essential part of enabling access to many services that people use on a daily basis. One challenge that can arise when using MFA includes viewing of an OTP by a non-authorized person. In particular, many electronic devices are configured to surface notifications such as text messages while a device is in a locked state. Surfacing notifications in a locked state is very convenient for viewing messages, as a user can glance at the lock screen of an electronic device and quickly obtain information without the need to unlock the device. However, when the message contains security information, such as a one-time passcode, the surfacing of that message enables an opportunity for a malicious actor to potentially obtain access and/or additional information about online accounts of the user that is associated with the electronic device. In particular, an electronic device, such as a smartphone or tablet computer, that is not being attended to by an authorized user, can reveal sensitive information to a malicious actor. Many applications utilize a one-time passcode (OTP) sent via text message to a user's mobile electronic device (e.g., smartphone, tablet, etc.) to provide access to applications and services. Thus, there currently exists vulnerabilities that a malicious actor could exploit. As an example, in a social gathering, when an electronic device is left unattended by the authorized user, a malicious actor can attempt account access from another device, which may trigger a multifactor authentication process that causes a one-time passcode to be sent to the user's electronic device. The malicious actor can then view the electronic device to observe the one-time passcode, gaining unauthorized access to online accounts and/or resources.

One or more embodiments alleviate the aforementioned issues by automatically obfuscating and/or withholding sensitive information, such as one-time passcodes from being visible within a notification presented on a locked screen of the user device and/or when the electronic device is not being attended to by an authorized user. According to the disclosure, incoming text messages, received while the device is locked and/or not being attended to by the authorized user, are analyzed to determine if the text messages contain transaction authentication information such as a one-time passcode or other sensitive information/content. If a determination is made that the message contains transaction authentication information such as a one-time passcode, one or more portions of the message are obfuscated, thereby preventing unauthorized viewing of the sensitive content. In one or more embodiments, when the device is later unlocked, the obfuscation is removed, enabling the viewing of the sensitive content. In one or more embodiments, the obfuscation is removed, enabling the viewing of the sensitive content, when the device is unlocked and being attended to by an authorized user.

One or more embodiments can include an electronic device that includes: at least one output device including a display; a memory having stored thereon at least one notification surfacing module (NSM) and a sensitive information obfuscation (SIO) module; a network interface which enables the electronic device to connect to, and receive notification data from, at least one second electronic device; and a processor communicatively coupled to the output device, the memory, and the network interface. The processor executes program code of the NSM module and the SIO module, which enables the electronic device to: in response to receiving a notification comprising sensitive information while the electronic device is in a locked state: determine that a notification setting of the electronic device enables presentation of received notifications while the electronic device is in the locked state; determine that the notification setting of the electronic device further includes dynamic obfuscation or withholding of the sensitive information when a presence of an authorized user of the electronic device is not confirmed; and in response to the notification setting including dynamic obfuscation/withholding of the sensitive information: automatically obfuscate the sensitive information from being presented during presentation of the notification; and present a modified notification on one of the at least one output device of the electronic device, where the modified notification includes the received notification with the sensitive information obfuscated or otherwise withheld.

The above descriptions contain simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

Each of the above and below described features and functions of the various different aspects, which are presented as operations performed by the processor(s) of the communication/electronic devices are also described as features and functions provided by a plurality of corresponding methods and computer program products, within the various different embodiments presented herein. In the embodiments presented as computer program products, the computer program product includes a non-transitory computer readable storage device having program instructions or code stored thereon, which enables the electronic device and/or host electronic device to complete the functionality of a respective one of the above-described processes when the program instructions or code are processed by at least one processor of the corresponding electronic/communication device, such as is described above.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one implementation (embodiment) of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not for other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element (e.g., a person or a device) from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within electronic device 100 (FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure. Throughout this disclosure, the terms 'electronic device', 'communication device', and 'electronic communication device' may be used interchangeably, and may refer to devices such as smartphones, tablet computers, and/or other computing/communication devices.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Referring now to the figures and beginning with FIG. 1, there is illustrated an example component makeup of electronic device 100, within which various aspects of the disclosure can be implemented, according to one or more embodiments. Electronic device 100 includes specific components that enable the device to perform automatic obfuscation of sensitive information in an outputted message, according to one or more embodiments. Examples of electronic device 100 include, but are not limited to, mobile devices, a notebook computer, a mobile phone, a smart phone, a digital camera with enhanced processing capabilities, a smart watch, a tablet computer, and other types of electronic device.

Electronic device 100 includes processor 102 (typically as a part of a processor integrated circuit (IC) chip), which includes processor resources such as central processing unit (CPU) 103a, communication signal processing resources such as digital signal processor (DSP) 103b, graphics processing unit (GPU) 103c, and hardware acceleration (HA) unit 103d. In some embodiments, the hardware acceleration (HA) unit 103d may establish direct memory access (DMA) sessions to route network traffic to various elements within electronic device 100 without direct involvement from processor 102 and/or operating system 124. Processor 102 can interchangeably be referred to as controller 102.

Processor 102 can, in some embodiments, include image signal processors (ISPs) (not shown) and dedicated artificial intelligence (AI) engines 105. In one or more embodiments, processor 102 can execute AI modules to provide AI functionality of AI engines 105. AI modules may include an artificial neural network, a decision tree, a support vector machine, Hidden Markov model, linear regression, logistic regression, Bayesian networks, and so forth. The AI modules can be individually trained to perform specific tasks and can be arranged as different sets of AI modules to generate different types of output. Controller 102 is communicatively coupled to storage device 104, system memory 120, input devices (introduced below), output devices, including integrated display 130, and image capture device (ICD) controller 134.

ICD controller 134 can perform image acquisition functions in response to commands received from processor 102 in order to control group 1 ICDs 132 and group 2 ICDs 133 to capture video or still images of a local scene within a FOV of the operating/active ICD. In one or more embodiments, group 1 ICDs can be front-facing, and group 2 ICDs can be rear-facing, or vice versa. Throughout the disclosure, the term image capturing device (ICD) is utilized interchangeably to be synonymous with and/or refer to any one of the cameras 132, 133. Both sets of cameras 132, 133 include image sensors that can capture images that are within the field of view (FOV) of the respective camera 132, 133. In one or more embodiments, presence of an authorized user of electronic device can be confirmed using images captured by any one of the cameras 132, 133 of a face looking at the electronic device that are processed via image recognition engines to identify the authorized device user.

In one or more embodiments, the functionality of ICD controller 134 is incorporated within processor 102, eliminating the need for a separate ICD controller. Thus, for simplicity in describing the features presented herein, the various camera selection, activation, and configuration functions performed by the ICD controller 134 are described as being provided generally by processor 102. Similarly, manipulation of captured images and videos are typically performed by GPU 103c and certain aspects of device communication via wireless networks are performed by DSP 103b, with support from CPU 103a. However, for simplicity in describing the features of the disclosure, the functionality provided by one or more of CPU 103a, DSP 103b, GPU 103c, and ICD controller 134 are collectively described as being performed by processor 102. Collectively, components integrated within processor 102 support computing, classifying, processing, transmitting and receiving of data and information, and presenting of graphical images within a display.

System memory 120 may be a combination of volatile and non-volatile memory, such as random-access memory (RAM) and read-only memory (ROM). System memory 120 can store program code or similar data associated with firmware 122, an operating system 124, and/or applications 126. During device operation, processor 102 processes program code of the various applications, modules, OS, and firmware, that are stored in system memory 120.

In accordance with one or more embodiments, applications 126 include, without limitation, sensitive information obfuscation (SIO) module 152, notification surfacing module (NSM) 154, and/or other applications, indicated as 156 and 157, and communication module 158. Each module and/or application provides program instructions/code that are processed by processor 102 to cause processor 102 and/or other components of electronic device 100 to perform specific operations, as described herein. Descriptive names assigned to these modules add no functionality and are provided solely to identify the underlying features performed by processing the different modules. For example, sensitive information obfuscation (SIO) module 152 includes program instructions for identifying and obfuscating portions of text messages containing transaction authentication information, and notification surfacing module (NSM) 154 includes program instructions for surfacing (displaying) notifications on a display of an electronic device.

In one or more embodiments, electronic device 100 includes removable storage device (RSD) 136, which is inserted into RSD interface 138 that is communicatively coupled via system interlink to processor 102. In one or more embodiments, RSD 136 is a non-transitory computer program product or computer readable storage device encoded with program code and corresponding data, and RSD 136 can be interchangeably referred to as a non-transitory computer program product. RSD 136 may have a version of one or more of the applications (e.g., 152, 154, 156, 158) and specifically sensitive information obfuscation (SIO) module 152 and notification surfacing module (NSM) 154 stored thereon. Processor 102 can access RSD 136 to provision electronic device 100 with program code that, when executed/processed by processor 102, the program code causes or configures processor 102 and/or generally electronic device 100, to provide the various security notification management functions described herein.

Electronic device 100 includes an integrated display 130 which incorporates a tactile, touch screen interface 131 that can receive user tactile/touch input. As a touch screen device, integrated display 130 allows a user to provide input to or to control electronic device 100 by touching features within the user interface presented on display 130. Tactile, touch screen interface 131 can be utilized as an input device. The touch screen interface 131 can include one or more virtual buttons, indicated generally as 115. In one or more embodiments, when a user applies a finger on the touch screen interface 131 in the region demarked by the virtual button 115, the touch of the region causes the processor 102 to execute code to implement a function associated with the virtual button. In some implementations, integrated display 130 is integrated into a front surface of electronic device 100 along with front ICDs, while the higher quality ICDs are located on a rear surface.

Electronic device 100 can further include microphone 108, one or more output devices such as speakers 144, and one or more input buttons, indicated as 107*a* and 107*b*. While two buttons are shown in FIG. 1, other embodiments may have more or fewer input buttons. Microphone 108 can also be referred to as an audio input device. In some embodiments, microphone 108 may be used for identifying a user via voiceprint, voice recognition, and/or other suitable techniques. Input buttons 107*a* and 107*b* may provide controls for volume, power, and ICDs 132, 133. Additionally, electronic device 100 can include input sensors 109 (e.g., sensors enabling gesture detection by a user).

Electronic device 100 further includes haptic touch controls 145, vibration device 146, fingerprint/biometric sensor 147, global positioning system (GPS) module 160, and motion sensor(s) 162. Vibration device 146 can cause electronic device 100 to vibrate or shake when activated. Vibration device 146 can be activated during an incoming call or message in order to provide an alert or notification to a user of electronic device 100. According to one aspect of the disclosure, integrated display 130, speakers 144, and vibration device 146 can generally and collectively be referred to as output devices.

Biometric sensor 147 can be used to read/receive biometric data, such as fingerprints, to identify or authenticate a user. In some embodiments, the biometric sensor 147 can supplement an ICD (camera) for user detection/identification.

GPS module 160 can provide time data and location data about the physical location of electronic device 100 using geospatial input received from GPS satellites. Motion sensor(s) 162 can include one or more accelerometers 163 and gyroscope 164. Motion sensor(s) 162 can detect movement of electronic device 100 and provide motion data to processor 102 indicating the spatial orientation and movement of electronic device 100. Accelerometers 163 measure linear acceleration of movement of electronic device 100 in multiple axes (X, Y and Z). Gyroscope 164 measures rotation or angular rotational velocity of electronic device 100. Electronic device 100 further includes a housing 137 (generally represented by the thick exterior rectangle) that contains/protects the components internal to electronic device 100.

Electronic device 100 also includes a physical interface 165. Physical interface 165 of electronic device 100 can serve as a data port and can be coupled to charging circuitry 135 and device battery 143 to enable recharging of device battery 143.

Electronic device 100 further includes wireless communication subsystem (WCS) 142, which can represent one or more front end devices (not shown) that are each coupled to one or more antennas 148. In one or more embodiments, WCS 142 can include a communication module with one or more baseband processors or digital signal processors, one or more modems, and a radio frequency (RF) front end having one or more transmitters and one or more receivers. Example communication module 158 within system memory 120 enables electronic device 100 to communicate with wireless communication network 176 and with other devices, such as server 175 and other connected devices, via one or more of data, audio, text, and video communications. Communication module 158 can support various communication sessions by electronic device 100, such as audio communication sessions, video communication sessions, text communication sessions, exchange of data, and/or a combined audio/text/video/data communication session.

WCS 142 and antennas 148 allow electronic device 100 to communicate wirelessly with wireless communication network 176 via transmissions of communication signals to and from network communication devices, such as base stations or cellular nodes, of wireless communication network 176. Wireless communication network 176 further allows electronic device 100 to wirelessly communicate with server 175, and other communication devices, which can be similarly connected to wireless communication network 176. In one or more embodiments, various functions that are being performed on communications device 100 can be supported using or completed via/on server 175. For example, server 175 can generate and transmit a message containing the authentication information that is received at electronic device 100

Electronic device 100 can also wirelessly communicate, via wireless interface(s) 178, with wireless communication network 176 via communication signals transmitted by short range communication device(s). Wireless interface(s) 178 can be a short-range wireless communication component providing Bluetooth, near field communication (NFC), and/or wireless fidelity (Wi-Fi) connections. In one or more embodiments, electronic device 100 can receive Internet or Wi-Fi based calls, text messages, multimedia messages, and other notifications via wireless interface(s) 178. In one or more embodiments, electronic device 100 can communicate wirelessly with external wireless device 166, such as a WiFi router or BT transceiver, via wireless interface(s) 178. In one or more embodiments, WCS 142 with antenna(s) 148 and wireless interface(s) 178 collectively provide wireless communication interface(s) of electronic device 100.

The electronic device 100 of FIG. 1 is only a specific example of devices that can be used to implement the embodiments of the present disclosure. Devices that utilize aspects of the disclosed embodiments can include, but are not limited to, a smartphone, a tablet computer, a laptop computer, a desktop computer, a wearable computer, and/or other suitable electronic device.

Figure 2:
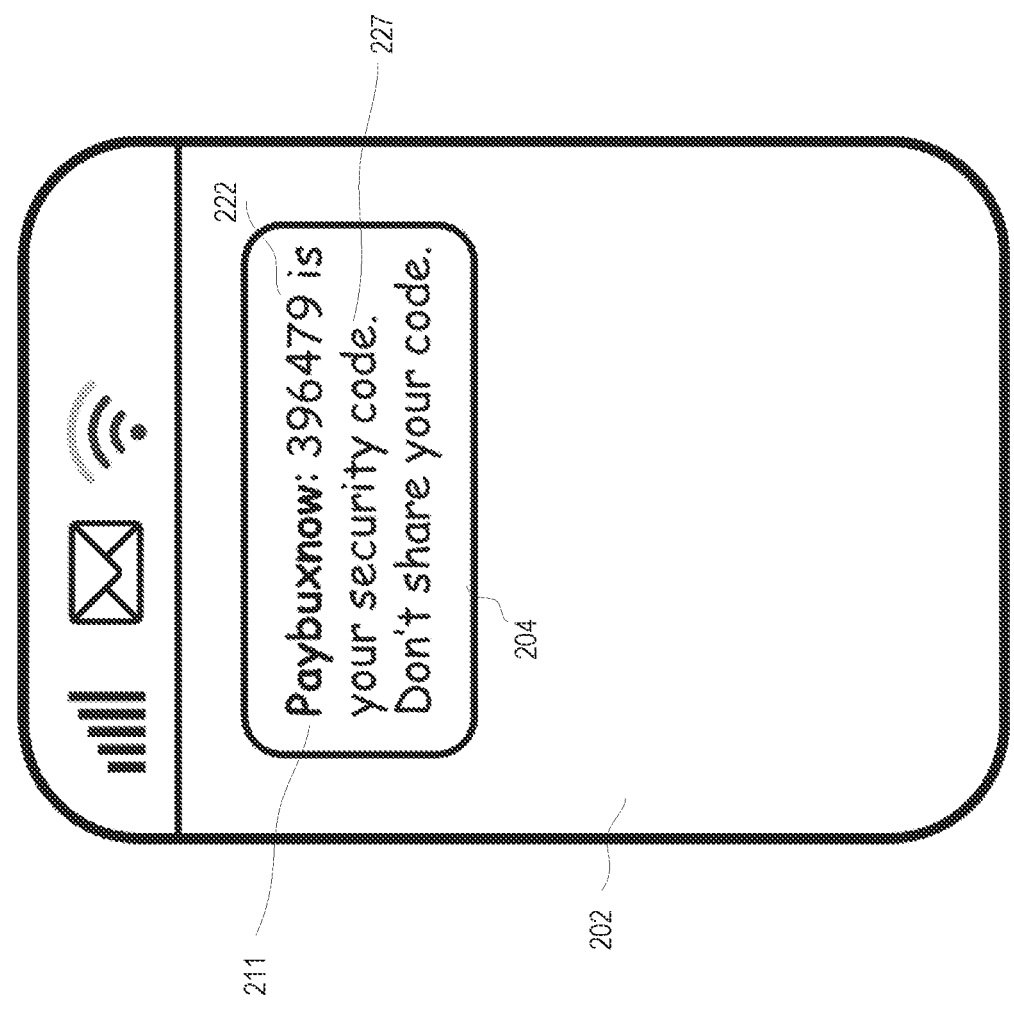
FIG. 2 illustrates an example of a security notification received at the communication device and which is subsequently obfuscated by the communication device, according to one or more embodiments.

FIG. 2 illustrates an example of a security notification received at the communication device and which is subsequently obfuscated by the communication device, according to one or more embodiments. Device 200 includes a display 202 on which a security notification is displayed. Device 200 can be an implementation of electronic device 100, having similar components and/or functionality. As shown in FIG. 2, a message 204 is shown on the display 202. The message 204 may be displayed while the device is in a locked state, or unlocked state, depending on how the user has configured message options. In one or more embodiments, a token analysis process is performed on message 204, in which the messages are tokenized, and one or more tokens from the message are inspected to determine if the message is a security notification that includes a one-time passcode (OTP). The tokenization process can include breaking down a text into smaller units called tokens. Tokens are typically words, but they can also be phrases, sentences, or individual characters or groups of characters. In one or more embodiments, a preprocessing step is performed prior to tokenization. The preprocessing step can include removing unnecessary whitespace, special characters, or other artifacts that could interfere with the tokenization process. As an example of analyzing a received message, message 204 includes tokens of a sender name 211 ("Paybuxnow" in the example of FIG. 2), a security code 222 adjacent to the sender name 211, and also contains the word 'code' at 227 as a token. In one or more embodiments, the processor determines if a notification contains a one-time-passcode (OTP) or other transaction authentication information, and analyzes the notification accordingly, to determine if the notification is a security notification, and apply dynamic obfuscation and/or withholding in accordance with one or more embodiments. Some embodiments may utilize additional and/or alternative techniques for identifying a security notification containing an OTP, such as machine learning, natural language processing, and/or other suitable techniques.

Figure 3:
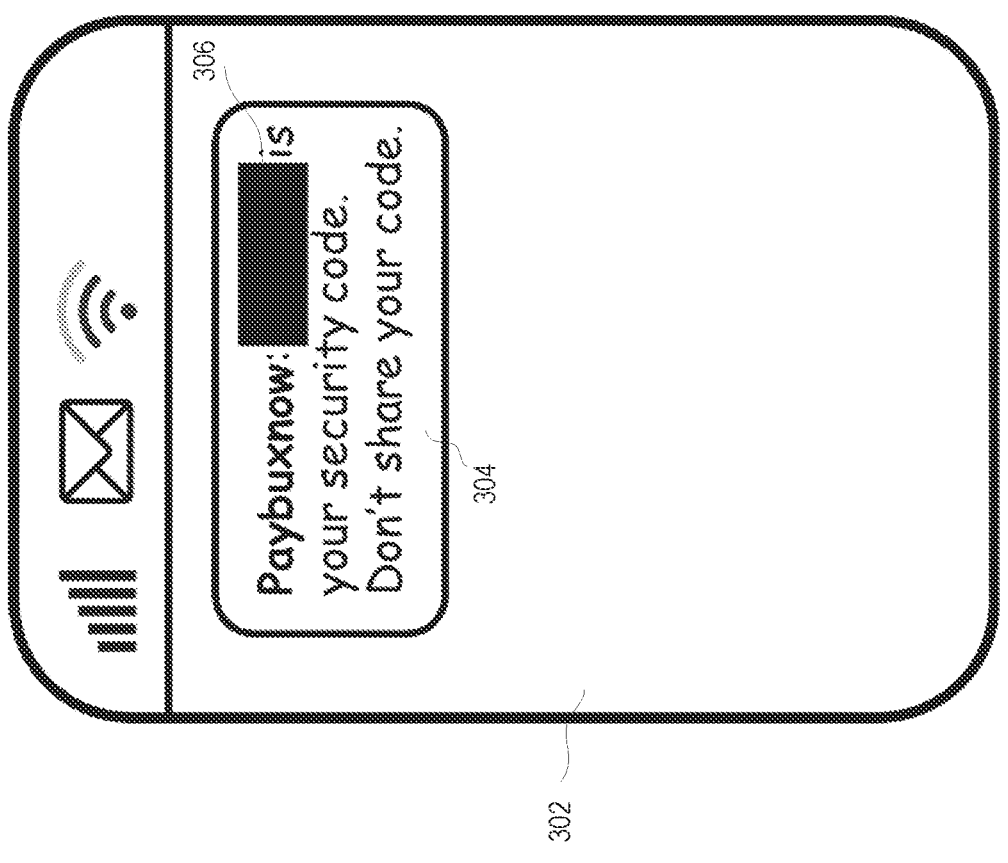
FIG. 3 illustrates an example of obfuscation of a received security notification, according to one or more embodiments.
Figure 3:

FIG. 3 illustrates an example of obfuscation of a received security notification, according to one or more embodiments. Continuing with the example shown in FIG. 2, device 300 includes a display 302 on which a security notification is displayed. Device 300 can be an implementation of electronic device 100, having similar components and/or functionality. As shown in FIG. 3, a message 304 is shown on the display 302. The message 304 includes an opaque graphical element 306 that is displayed, covering the security code (e.g., 222 of FIG. 2). In one or more embodiments, the processor of device 300 identifies a message (e.g., an SMS text message) as a security notification. The processor then identifies a security code within the message, and identifies the pixel coordinates of a bounding box for the security code. The processor then renders an obfuscation graphic in the region of the bounding box, such as shown by opaque graphical element 306. One or more embodiments can include: identifying a type of notification and the sensitive information within the received notification; identifying a location of the sensitive information within the received notification corresponding to a region that circumscribes the sensitive information; and overlaying the region that circumscribes the sensitive information with an opaque graphical element.

Accordingly, the security information is prevented from being potentially revealed to an unauthorized person. In one or more embodiments, the sensitive information is a one-time passcode, and the one or more embodiments further include: determining that the electronic device is in the locked state; determining that the received notification, which is to be surfaced on a lock screen of the electronic device, contains the one-time passcode; and generating the modified notification to include the received notification with at least one opaque graphical element that obfuscates at least the one-time passcode.

Figure 4:
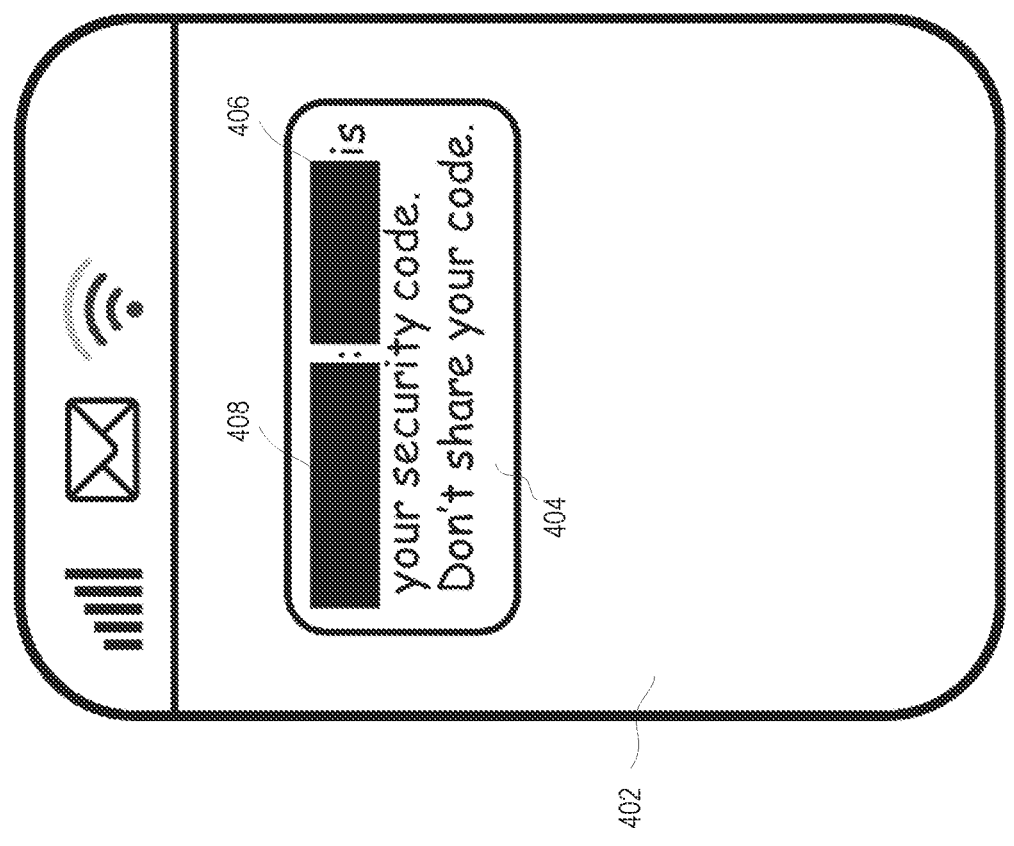
FIG. 4 illustrates another example of obfuscation of a received security notification, showing multiple opaque graphical elements for obfuscating information, according to one or more embodiments.

FIG. 4 illustrates another example of obfuscation of a received security notification, showing multiple opaque graphical elements, according to one or more embodiments. The embodiment shown in FIG. 4 is useful for protecting the source of notifications. As an example, it may be desirable to obfuscate the sender when the sender is a financial institution, so as not to reveal which financial institution a user is a member of. In one or more embodiments, the device 400 may obtain and/or store a list of senders that are to be obfuscated when a message is obfuscated. Continuing with the example shown in FIG. 2, device 400 includes a display 402 on which a security notification is displayed. Device 400 can be an implementation of electronic device 100, having similar components and/or functionality. As shown in FIG. 4, a message 404 is shown on the display 402. The message 404 includes a first opaque graphical element 406 that is displayed, covering the security code (e.g., 222 of FIG. 2). In one or more embodiments, the processor of device 300 identifies a message (e.g., an SMS text message) as a security notification. The processor then identifies a security code within the message, and identifies the coordinates of a bounding box for the security code. The processor then renders an opaque graphical element such as shown as opaque graphical element 406. The message 404 includes a second opaque graphical element 408 that is displayed, covering the sender information (e.g., 211 of FIG. 2). Accordingly, the embodiment of FIG. 4 obfuscates both the security code and the sender information, to prevent both pieces of security information from being potentially revealed to an unauthorized person.

Figure 5A:
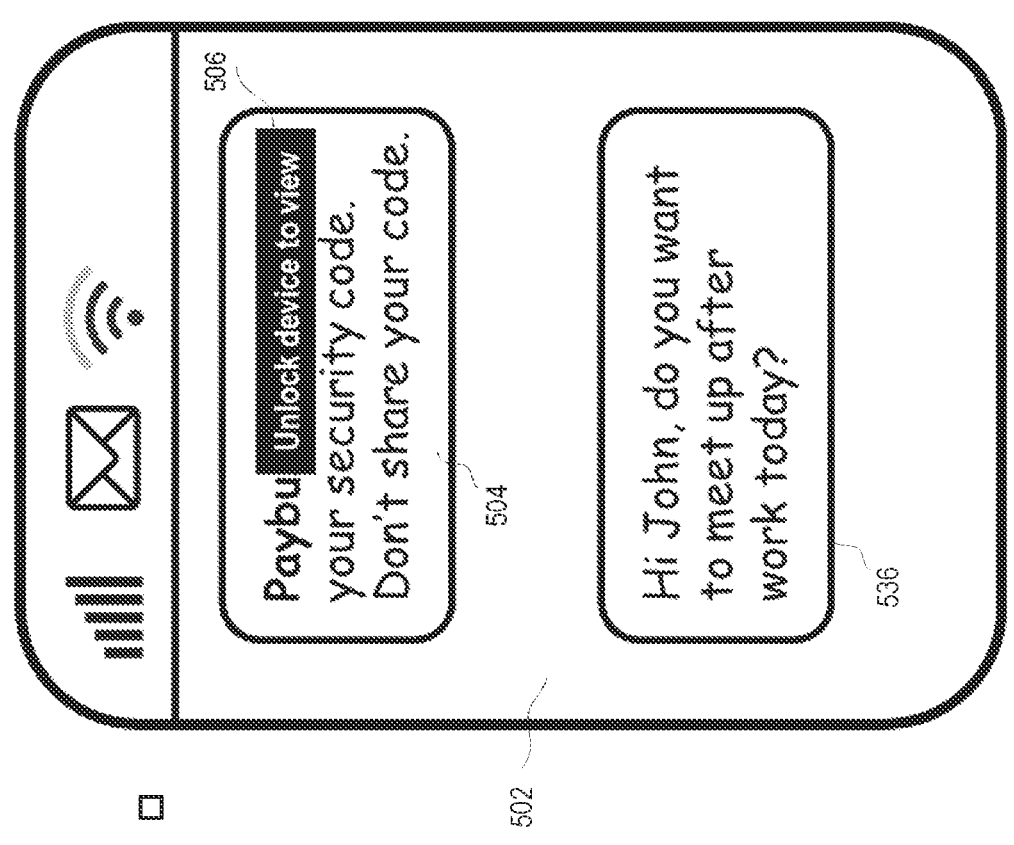
FIG. 5A illustrates another example of obfuscation of a received security notification, showing an opaque graphical element that includes text thereon, according to one or more embodiments.

FIG. 5A illustrates another example of obfuscation of a received security notification, showing an opaque graphical element that includes text thereon, according to one or more embodiments. Device 500 can be an implementation of electronic device 100, having similar components and/or functionality. As shown in FIG. 5A, a message 504 is shown on the display 502. The message 504 includes an opaque graphical element 506 that is displayed, covering the security code (e.g., 222 of FIG. 2). Similar to the processes associated with FIG. 4, the processor of device 500 identifies a message (e.g., an SMS text message) as a security notification, identifies a security code within the message, identifies the coordinates of a bounding box for the security code, and renders an opaque graphical element 506 over the region of the bounding box along with additional text and/or graphics. In one or more embodiments, the processor then renders text and/or graphics on, above, surrounding, or proximate to the opaque graphical element. As shown in FIG. 5A, the opaque graphical element 506 includes the text "Unlock device to view" visible atop the region of the obfuscated security code. Thus, the text rendered within opaque graphical element 506 instructs the user to unlock the device. After the device is unlocked, the processor of the device 500 can remove the opaque graphical element 506, enabling the code (e.g., 222 of FIG. 2) underlying the opaque graphical element 506 to be viewed. In one or more embodiments, multiple text messages may be displayed on a lock screen of an electronic device. As illustrated in FIG. 5A, another text message 536 is shown, which is a non-OTP message. In one or more embodiments, non-OTP messages may be clearable from the lock screen, while messages containing an OTP and/or other security information may have clearing from the lock screen disabled. The disabling of clearing of messages containing an OTP and/or other security information can provide an additional level of security.

Figure 5B:
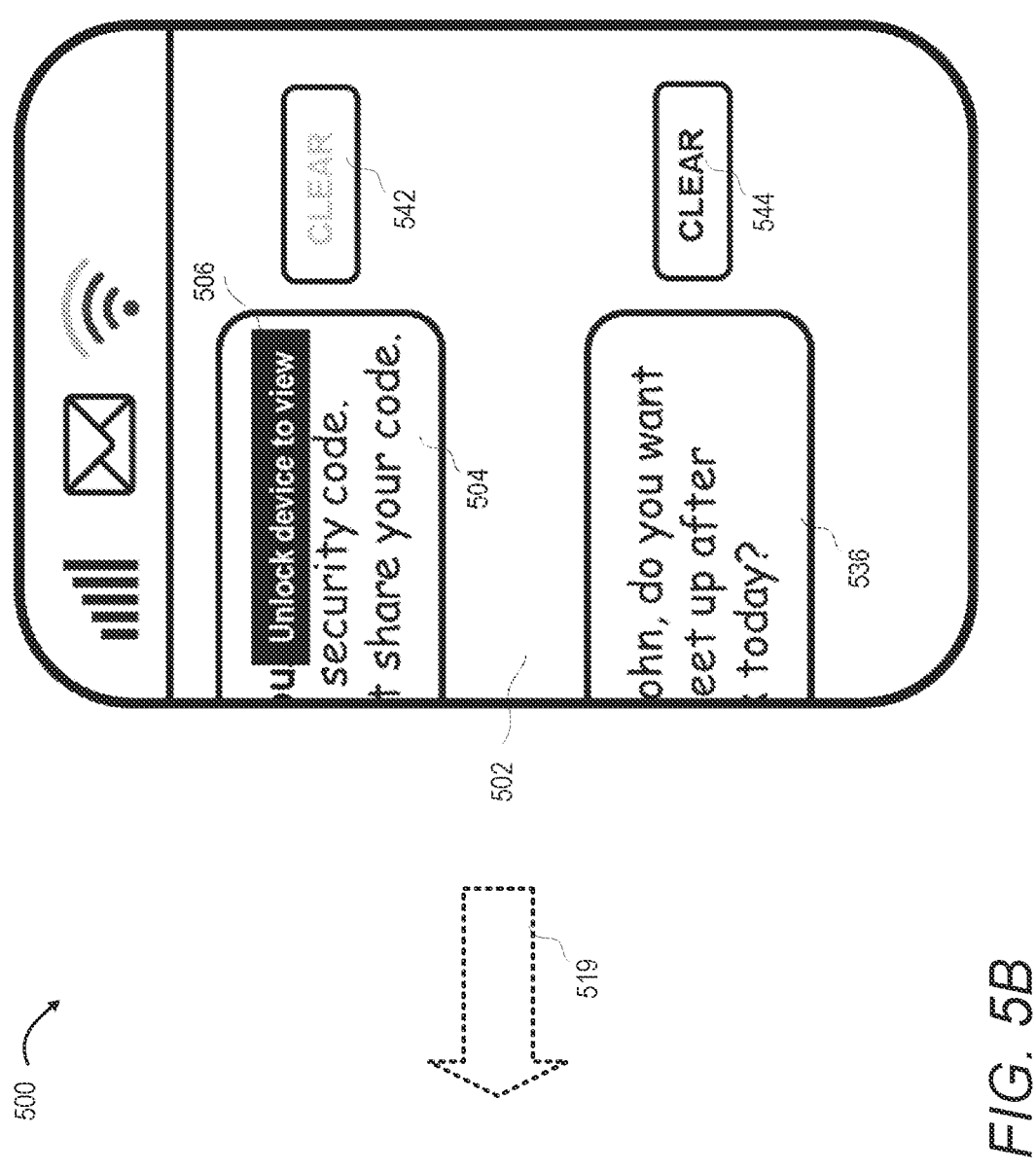
FIG. 5B illustrates disabling the clearing of a received security notification from a lock screen of an electronic device, according to one or more embodiments.

FIG. 5B illustrates disabling the clearing of a received security notification from a lock screen of an electronic device, according to one or more embodiments. Continuing from the example shown in FIG. 5A, the messages 504 and 536 are shown as swiped to the left (e.g., by a user swiping his/her finger along the display 502 in the direction indicated by arrow 519), revealing a corresponding clear button 542 for message 504, and a clear button 544 for message 536. Both messages 504 and 536 are shown as swiped to the left in FIG. 5B to illustrate the operation of the clear message option while an electronic device is in a locked configuration. Note that while both message 504 and 536 are shown as swiped to the left, in one or more embodiments, each message may be swiped individually, revealing a corresponding clear button. Other embodiments may utilize a different technique for clearing a message. As can be seen in FIG. 5B, the clear button 542 is grayed out, indicating that the clearing is disabled for message 504, while the clear button 544 is enabled, indicating that message 536 is clearable. An advantage of the disabling of clearing of messages containing an OTP and/or other security information is that in the case of a malicious actor attempting to obtain an OTP from another user's unattended electronic device, the evidence of the attempt remains on the lock screen. When the authorized user returns to his/her electronic device, the message 504 remains visible on the lock screen. If the user notices obfuscated security messages that were not solicited by him/her, then the user is alerted that someone else may have been trying gain access to an account belonging to the user. Notification of unauthorized access attempts is an important part of any cybersecurity strategy, and features of one or more embodiments, including the disabling of clearing of messages containing OTPs and/or other security information helps promote improved cybersecurity.

Figure 5C:
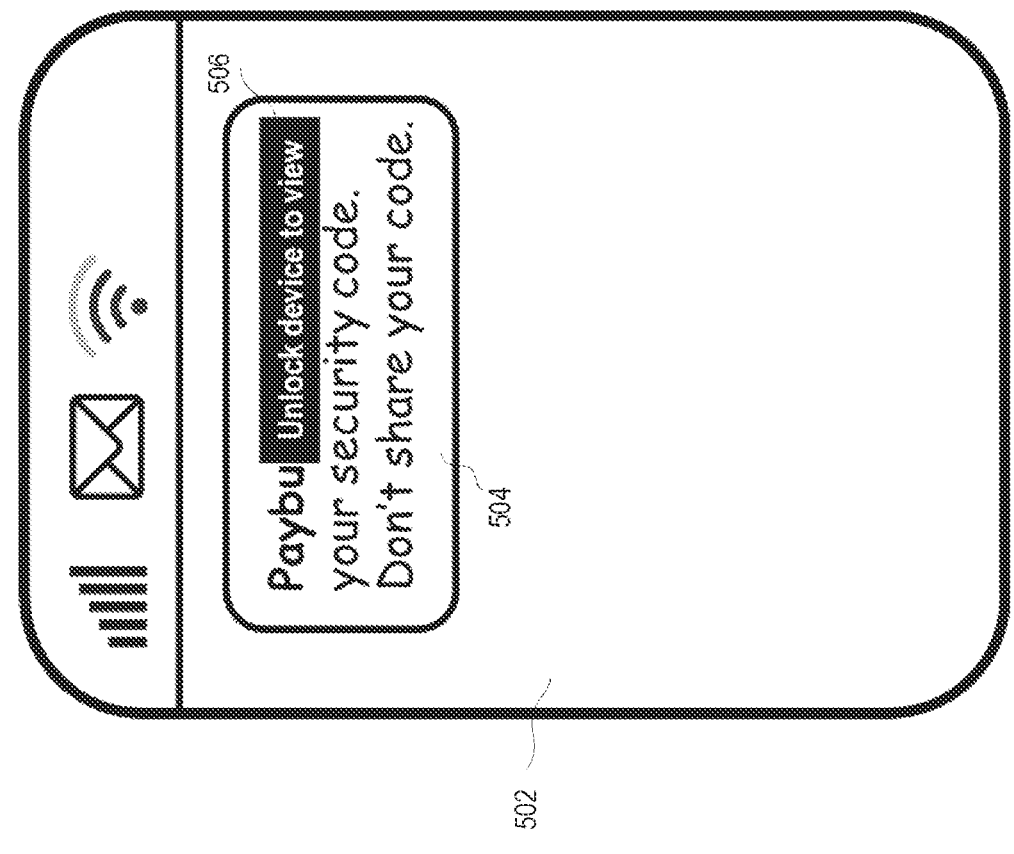
FIG. 5C illustrates clearing of a non-OTP message, according to one or more embodiments.
Figure 5C:
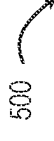

FIG. 5C illustrates clearing of a non-OTP message, according to one or more embodiments. Continuing from the example of FIG. 5B, the non-OTP message 536 is cleared (e.g., via button 544 of FIG. 5B) and thus, is no longer shown on display 502 of device 500 as illustrated in FIG. 5C. The message 504 remains visible on the lock screen, as the clearing of message 504 is disabled, according to one or more embodiments.

Figure 6:
FIG. 6 illustrates an example of a sensitive information arrival notification icon in a status region of the display, according to one or more embodiments.

FIG. 6 illustrates an example of a sensitive information arrival icon presented in a status region of the display, according to one or more embodiments. Device 600 can be an implementation of electronic device 100, having similar components and/or functionality. As shown in FIG. 6, a sensitive information arrival icon 608 is shown in a status region 614 of the display 602. In one or more embodiments, the sensitive information arrival icon 608 includes an indication of how many messages containing sensitive information have been received since the device 600 has been locked. In the example shown in FIG. 6, the sensitive information arrival icon 608 includes the number "7" which indicates that seven messages that contain sensitive information (e.g., one-time passcodes) have arrived. Accordingly, one or more embodiments include, in response to the notification setting including withholding of the sensitive information until confirmation of the presence of the authorized device user, (and optionally while the device is in the locked stated), the disclosed processes include the processor rendering a sensitive information arrival icon in a status region of a display of the electronic device in lieu of presenting the modified notification until the presence of the authorized user is detected.

In one or more embodiments, for each received text message that is deemed to contain sensitive information, the count value (shown as '7' in sensitive information arrival icon 608), is incremented. In one or more embodiments, the count value is cleared once the device is unlocked. In one or more embodiments, the count value can be cleared manually by a user (e.g., by double-tapping on the sensitive information arrival icon 608). Alternatively, in one or more embodiments, the count value can be cleared automatically after a predetermined time period (e.g., following ten minutes after a last text message containing sensitive information was received).

Figure 7:
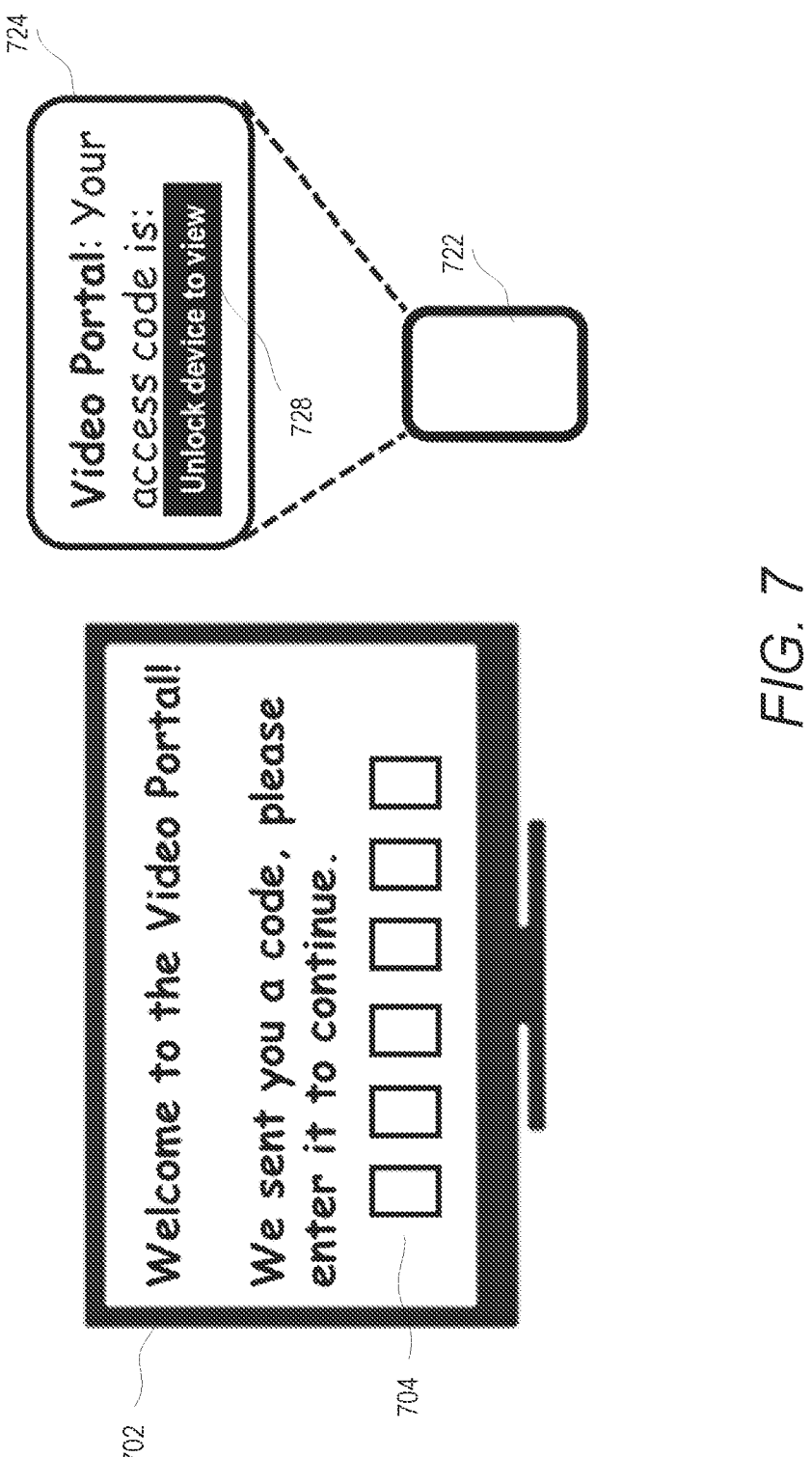
FIG. 7 shows an example use case for one or more embodiments, in which a malicious actor attempts account access from another device, triggering a multifactor authentication process that causes a one-time passcode to be sent to the user's electronic device.

FIG. 7 shows an example use case for one or more embodiments, in which a malicious actor attempts account access from another device, triggering a multifactor authentication process that causes a one-time passcode to be sent to the user's electronic device, according to one or more embodiments. In the example of FIG. 7, a television 702 is shown, along with a nearby electronic device 722 that is not being attended to by an authorized user and/or is in the locked state. Device 722 can be an implementation of electronic device 100, having similar components and/or functionality. In the presented scenario, an unauthorized user attempts to access a video account, and the video account utilizes a multifactor authentication (MFA) process, in which the MFA process causes a message containing a one-time passcode to be sent to the electronic device 722. The one-time passcode, once entered in field 704 shown on television 702, enables access to the video account. Prior to the implementation of the features described by the present disclosure, an unauthorized user may observe the message 724 appear on the display of electronic device 722 and thus gain access to the user's video account. With implementation of the features of disclosed embodiments, an opaque graphical element 728 is rendered over the one-time passcode that is presented within the message, preventing the unauthorized user from viewing the one-time passcode and from accessing the video account. Accordingly, one or more embodiments can be used as part of an online account security protection initiative.

Figure 8:
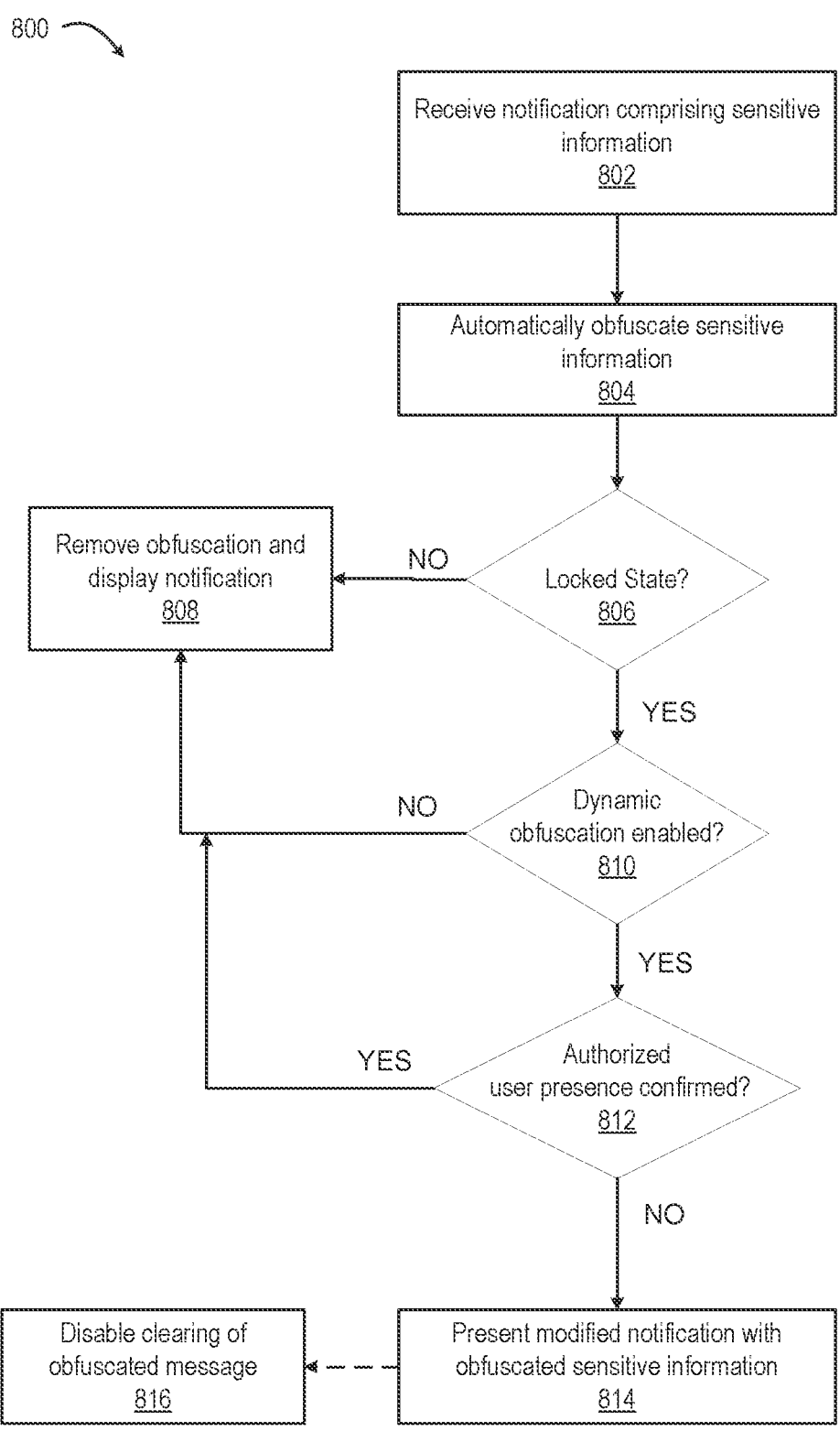
FIG. 8 depicts a flowchart of a method for obscuring sensitive information contained within a message that is received while the electronic device is not being attended to by an authorized user, according to one or more embodiments.

Referring now to the flowchart presented by FIG. 8, the descriptions of the methods in FIG. 8 are provided with general reference to the specific components and features illustrated within the preceding FIGS. 1-7. Specific components referenced in the methods of FIG. 8 may be identical or similar to components of the same name used in describing preceding FIGS. 1-7. In one or more embodiments, processor 102 (FIG. 1) configures electronic device 100 (FIG. 1) to provide the described functionality of the methods of FIG. 8 by executing program code for one or more modules or applications provided within system memory 120 of electronic device 100, including sensitive information obfuscation (SIO) module 152 and notification surfacing module (NSM) 154 (FIG. 1).

FIG. 8 depicts a flowchart of a method 800 for obscuring sensitive information contained within a message that is received while the electronic device is not being attended to by an authorized user, according to one or more embodiments. The method 800 starts at block 802, where a notification comprising sensitive information is received on an electronic device, such as device 100 of FIG. 1. The notification can include a text message. The notification can include a one-time passcode (OTP). The notification can also include a sender identifier. In one or more embodiments, the notification can be sent as part of an MFA process. The method continues to block 804, where sensitive information is automatically obfuscated. The method 800 continues to block 806, where a check is made to determine if the electronic device is locked. One or more embodiments can include: identifying that the notification is received while the electronic device is a locked state; determining that the notification setting of the electronic device enables presentation of received notifications while the electronic device is in the locked state; and presenting the modified notification with the sensitive information obfuscated on the at least one output device further in response to the receipt of the notification while the electronic device is in the locked state If, at block 806, the processor of the electronic device that receives the message determines that the electronic device is not in a locked state, the method 800 continues to block 808, where the notification is displayed without obfuscation, such as shown with message 204 of FIG. 2. If, at block 806, the processor determines that the electronic device is in a locked state, the method 800 continues to block 810, where a check is made to determine if an option for dynamic obfuscation is enabled. If, at block 810, the processor determines that the dynamic obfuscation option is not enabled, then the process continues to block 808, where the notification is displayed without obfuscation, such as shown with message 204 of FIG. 2. If, at block 810, the processor determines that the dynamic obfuscation option is enabled, then the method 800 continues to block 812, where the processor determines if an authorized user of the electronic device is present. The criteria for presence can include determining if an authorized user is within a specified proximity from the electronic device, and/or detected by one or more sensors and/or peripherals of the electronic device. In one or more embodiments, to determine whether the electronic device is being attended to by the authorized user, the processor: monitors image data received from the camera for a presence of an authorized user (e.g., via facial recognition) during a period immediately prior to presenting the notification and during a presentation of the notification; and the processor initiates generation of the modified notification in response to an absence of the authorized user within the image data.

One or more embodiments may utilize facial identification techniques to determine that the electronic device is, or is not being attended to by an authorized user. In one or more embodiments, the facial identification techniques include face detection. One or more embodiments may utilize Haar cascades, and/or deep learning-based techniques for face detection. Once a face is detected, one or more embodiments extract specific facial features for analysis. The facial features can include, but are not limited to, the distance between the eyes, the shape of the nose, the contour of the face, and/or other distinguishable characteristics. One or more embodiments may utilize facial landmarks. The facial landmarks can designate specific points on the face, such as the corners of the eyes, nose, and mouth. In one or more embodiments, the facial features are compared with stored templates of the authorized user's face in a database. The facial identification process can include measuring the similarity between the input face and the stored templates.

In one or more embodiments, to determine whether the electronic device is not being attended to by an authorized user, the processor: monitors audio data received from the microphone for a presence of an authorized user during a period immediately prior to presenting the notification and during a presentation of the notification; and the processor initiates generation of the modified notification in response to an absence of the voice patterns of the authorized user within the audio data. One or more embodiments can include: determining that the electronic device is not being attended to by an authorized user; and generating the modified notification, based at least in part on the electronic device not being attended to by an authorized user.

One or more embodiments may utilize audio-based identification techniques to determine whether the electronic device is or is not being attended to by an authorized user. The audio-based identification techniques can be based on unique physiological and behavioral characteristics of an individual's voice. The characteristics can include pitch, tone, rhythm, and/or other vocal characteristics. One or more embodiments can extract specific features from an individual's speech signal (e.g., detected via device microphone) for analysis. The identification of a particular individual as an authorized user can include comparing the extracted features with reference patterns stored in memory of the electronic device and/or a network-accessible database. One or more embodiments may utilize a text-independent voice identification process that can identify speakers based on any spoken content without requiring specific phrases. One or more embodiments may utilize machine learning from artificial intelligence (AI) engines 105 and/or signal processing provided by DSP 103b of FIG. 1, for performing audio-based identification. One or more embodiments may utilize both audio-based identification techniques and facial identification techniques in combination to provide an additional level of security and accuracy in determining that the electronic device is, or is not being attended to by an authorized user.

In one or more embodiments, the proximity of a wearable computing device, such as a smartwatch, is used in determining that the electronic device is, or is not being attended to by an authorized user. As an example, for an authorized user that has a smartwatch that is paired to his/her smartphone, the presence of the smartwatch in proximity to the smartphone as detected by the smartphone can be used in determining that the electronic device is or is not being attended to by an authorized user. One or more embodiments may utilize Bluetooth®, Bluetooth Low Energy, NFC (Near Field Communication), and/or other suitable protocols to pair the wearable computer to the electronic device. One or more embodiments may use a received signal strength indication (RSSI) for detecting that the proximity of the wearable computing device is within a predetermined threshold distance of the electronic device (e.g., smartphone, tablet computer, etc.). In an example, the predetermined threshold distance is two meters. One or more embodiments may utilize the proximity of a wearable computing device along with one or more biometric techniques, such as the audio-based identification techniques and/or facial identification techniques previously described, to provide an additional level of security and accuracy in determining that the electronic device is, or is not being attended to by an authorized user.

If, at block 812, a determination is made that an authorized user is present, then the method 800 continues to block 808, where the notification is displayed without obfuscation, such as shown with message 204 of FIG. 2. Thus, one or more embodiments can include: removing the at least one opaque graphical element from the received notification in response to determining a lock state of the electronic device changes to an unlocked state via completion of a user authentication. If, at block 812, a determination is made that an authorized user is not present, then the method 800 continues to block 814, where the modified notification with obfuscated sensitive information is presented, such as shown with message 304 of FIG. 3, message 404 of FIG. 4, and message 504 of FIG. 5A. Optionally, the method 800 may continue to block 816, where the clearing of the obfuscated message from the lock screen is disabled. In one or more embodiments, as long as the electronic device remains in a locked state, the clearing of the obfuscated message cannot be cleared. The rationale for this feature can include creating awareness that secure information has been sent to the electronic device. As an example, a malicious actor may attempt to send a one-time passcode to an electronic device that is not being attended to by an authorized user. Upon observing that the message containing the one-time passcode is obfuscated, the malicious actor may attempt to clear the message, to prevent the authorized user from noticing the message when he/she returns to the electronic device. With the feature provided by block 816, the obfuscated message remains on the lock screen, such that when the authorized user returns to his/her device, the user can notice that an attempted account login and/or OTP access was performed. An example of the feature of block 816 is illustrated in FIG. 5B with button 542 that indicates clearing of a message containing an OTP is disabled. Thus, one or more embodiments can include disabling clearing of the modified notification that includes the sensitive information obfuscated, from a lock screen of the electronic device while the electronic device remains in the locked state.

In one or more embodiments, the criterion of checking the locked state at block 806 may be omitted. In the case where the criterion of checking the locked state at block 806 is omitted, received messages can be automatically obfuscated based on unconfirmed user presence. In these embodiments, even when the device is unlocked, received messages may be shown with sensitive information obfuscated if the presence of an authorized user is not confirmed (e.g., via images and/or audio acquired by the device, and/or other biometric information). In one or more embodiments, a user setting may enable the feature of obfuscating received messages, even in an unlocked state, if an authorized user is not detected. One use case for this feature is that of a parent sharing his/her device with a child. Often, a parent may let a young child use their device (e.g., smartphone) temporarily (e.g., to occupy the child, allow the child to play a game, watch a video, etc.). The parent may invoke the option to obfuscate received messages while the device is unlocked if an authorized user is not detected, so that the child does not see sensitive information such as one-time passcodes from messages that may be received while the child is using the device.

As can now be appreciated, disclosed embodiments provide techniques for obfuscating sensitive information in outputted messages while the receiving electronic device is not being attended to by an authorized user. Protecting sensitive information, such as one-time passcodes (OTPs), is crucial for ensuring the security of online accounts. OTPs provide an additional layer of authentication beyond usernames and passwords. The use of OTPs makes it more challenging for unauthorized individuals to gain access to an account since they would need both the password and the current OTP. Disclosed embodiments provide additional protection for OTPs, thus, providing additional security for online accounts. Advantages of disclosed embodiments can include mitigation of credential theft. Thus, even if a password for a user is compromised, the attacker would still need the current OTP to access the account. The use of an OTP as a criterion for account access reduces the impact of credential theft, as stolen passwords alone are insufficient for unauthorized access. Additional advantages of disclosed embodiments can include resistance to phishing attacks. Thus, even if a user unknowingly provides his/her password to a phishing site, the attacker would still need the OTP sent to the legitimate user's device to access the account. For online transactions, especially financial transactions, OTPs add an extra layer of security. The use of OTPs ensures that even if an attacker has the user's account credentials, they still need a time-sensitive OTP to complete a transaction. In one or more embodiments, not only is the code obfuscated, but the sender is also obfuscated, thereby providing additional protection for important accounts such as financial accounts. In one or more embodiments, an audio message may be obfuscated. An example scenario can include when accessibility settings are invoked that cause incoming text messages to be read aloud automatically via a text-to-speech process. One or more embodiments may detect one-time passcodes and mute or scramble the audio to when an authorized user is not detected, thereby reducing the risk of unauthorized access to the one-time passcode. Thus, disclosed embodiments provide features for protecting sensitive information such as OTPs, thereby serving in an important role in fortifying online security, preventing unauthorized access, and safeguarding user accounts and data.

In the above-described methods, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals, but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:

at least one output device comprising a display;

a memory having stored thereon at least one notification surfacing module (NSM) and a sensitive information obfuscation (SIO) module;

a network interface which enables the electronic device to connect to, and receive notification data from, at least one second electronic device; and a processor communicatively coupled to the output device, the memory, and the network interface, and which executes program code of the NSM module and the SIO module, which enables the electronic device to:

in response to receiving a notification comprising sensitive information:

determine that a notification setting of the electronic device includes dynamic obfuscation or withholding of the sensitive information when a presence of an authorized user of the electronic device is not confirmed;

in response to the notification setting including dynamic obfuscation of the sensitive information when a presence of an authorized user of the electronic device is not confirmed:

automatically obfuscate the sensitive information from being presented during presentation of the notification; and present a modified notification on one of the at least one output device of the electronic device, wherein the modified notification includes the received notification with the sensitive information obfuscated; and in response to the notification setting including withholding of the sensitive information until confirmation of the presence of the authorized user, renders a sensitive information arrival icon in a status region of the display in lieu of presenting the modified notification.

2. The electronic device of claim 1, wherein further the processor:

identifies that the notification is received while the electronic device is a locked state;

determines that the notification setting of the electronic device enables presentation of received notifications while the electronic device is in the locked state; and presents the modified notification with the sensitive information obfuscated on the at least one output device further in response to receipt of the notification while the electronic device is in the locked state.

3. The electronic device of claim 2, wherein further, the processor removes at least one opaque graphical element from the received notification in response to determining a lock state of the electronic device changes to an unlocked state via completion of a user authentication.

4. The electronic device of claim 2, wherein further, the processor disables clearing of the modified notification from a lock screen of the electronic device while the electronic device remains in the locked state.

5. The electronic device of claim 1, wherein to generate the modified notification, the processor configures the electronic device to:

identify a type of notification and the sensitive information within the received notification;

identify a location of the sensitive information within the received notification; and overlay a region that circumscribes the sensitive information with an opaque graphical element.

6. The electronic device of claim 1, wherein further, the processor:

determines that the electronic device is not being attended to by an authorized user; and generates the modified notification, based at least in part on the electronic device not being attended to by the authorized user.

7. The electronic device of claim 6, wherein the electronic device further comprises a camera communicatively coupled to the processor, and wherein to determine whether the electronic device is being attended to by the authorized user, the processor:

monitors image data received from the camera for a presence of an authorized user during a period immediately prior to presenting the notification and during a presentation of the notification; and initiates generation of the modified notification in response to an absence of the authorized user within the image data.

8. The electronic device of claim 6, wherein the electronic device further comprises a microphone communicatively coupled to the processor, and wherein to determine the electronic device is not being attended to by an authorized user, the processor:

monitors audio data received from the microphone for a presence of voice patterns of an authorized user during a period immediately prior to presenting the notification and during a presentation of the notification; and initiates generation of the modified notification in response to an absence of a voice of the authorized user within the audio data.

9. A method comprising:

receiving, by a processor of an electronic device, a notification comprising sensitive information;

determining that a notification setting of the electronic device further includes dynamic obfuscation or withholding of the sensitive information when a presence of an authorized user of the electronic device is not confirmed;

in response to the notification setting including dynamic obfuscation of the sensitive information when a presence of an authorized user of the electronic device is not confirmed:

automatically obfuscating the sensitive information from being presented during presentation of the notification; and presenting a modified notification on at least one output device of the electronic device, wherein the modified notification includes the received notification with the sensitive information obfuscated; and in response to the notification setting including withholding of the sensitive information until confirmation of the presence of the authorized user, renders a sensitive information arrival icon in a status region of the display in lieu of presenting the modified notification.

10. The method of claim 9, further comprising:

identifying that the notification is received while the electronic device is a locked state;

determining that the notification setting of the electronic device enables presentation of received notifications while the electronic device is in the locked state; and presenting the modified notification with the sensitive information obfuscated on the at least one output device further in response to receipt of the notification while the electronic device is in the locked state.

11. The method of claim 10, further comprising disabling clearing of the modified notification that includes the sensitive information obfuscated, from a lock screen of the electronic device while the electronic device remains in the locked state.

12. The method of claim 9, wherein generating the modified notification comprises:

identifying a type of notification and the sensitive information within the received notification;

identifying a location of the sensitive information within the received notification corresponding to a region that circumscribes the sensitive information; and overlaying the region that circumscribes the sensitive information with an opaque graphical element.

13. The method of claim 12, further comprising removing the opaque graphical element from the received notification in response to determining a lock state of the electronic device changes to an unlocked state via completion of a user authentication.

14. The method of claim 9, further comprising:

determining that the electronic device is not being attended to by an authorized user; and generating the modified notification, based at least in part on the electronic device not being attended to by an authorized user.

15. The method of claim 14, wherein the electronic device further comprises a camera communicatively coupled to the processor, and determining that the electronic device not being attended to by an authorized user comprises:

monitoring image data received from the camera for a presence of an authorized user during a period immediately prior to presenting the notification and during a presentation of the notification; and initiating generation of the modified notification in response to an absence of the authorized user within the image data.

16. The method of claim 14, wherein the electronic device further comprises a microphone communicatively coupled to the processor, and determining that the electronic device not being attended to by an authorized user comprises:

monitoring audio data received from the microphone for a presence of an authorized user during a period immediately prior to presenting the notification and during a presentation of the notification; and initiating generation of the modified notification in response to an absence of voice patterns of the authorized user within the audio data.

17. A computer program product comprising a non-transitory computer readable medium having program instructions that when executed by a processor of an electronic device comprising at least one output device comprising a display, configure the electronic device to perform functions comprising:

receiving, by the processor of the electronic device, a notification comprising sensitive information;

determining that a notification setting of the electronic device further includes dynamic obfuscation of the sensitive information when a presence of an authorized user of the electronic device is not confirmed;

in response to the notification setting including dynamic obfuscation or withholding of the sensitive information when a presence of an authorized user of the electronic device is not confirmed:

automatically obfuscating the sensitive information from being presented during presentation of the notification; and presenting a modified notification on one of the at least one output device of the electronic device, wherein the modified notification includes the received notification with the sensitive information obfuscated; and in response to the notification setting including withholding of the sensitive information until confirmation of the presence of the authorized user, renders a sensitive information arrival icon in a status region of the display in lieu of presenting the modified notification.

18. The computer program product of claim 17, wherein the sensitive information is a one-time passcode, the computer program product further comprising program instructions for:

determining that the electronic device is in a locked state;

determining that the received notification, which is to be surfaced on a lock screen of the electronic device, contains the one-time passcode; and generating the modified notification to include the received notification with at least one opaque graphical element that obfuscates at least the one-time passcode.

* * * * *